United States Patent
Park et al.

(10) Patent No.: US 9,832,587 B1
(45) Date of Patent: Nov. 28, 2017

(54) ASSISTED NEAR-DISTANCE COMMUNICATION USING BINAURAL CUES

(71) Applicant: QUALCOMM Incorporated, San Diego, CA (US)

(72) Inventors: Hyun Jin Park, San Diego, CA (US); Ren Li, San Diego, CA (US); Deepak Kumar Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/260,070

(22) Filed: Sep. 8, 2016

(51) Int. Cl.
*H04R 1/10* (2006.01)
*H04S 7/00* (2006.01)
*G10L 25/93* (2013.01)
*H04R 5/033* (2006.01)
*G10L 15/25* (2013.01)
*G01S 13/93* (2006.01)

(52) U.S. Cl.
CPC .............. *H04S 7/304* (2013.01); *G10L 15/25* (2013.01); *G10L 25/93* (2013.01); *H04R 5/033* (2013.01); *H04S 7/303* (2013.01); *G01S 13/931* (2013.01)

(58) Field of Classification Search
CPC ......... H04S 7/304; H04S 7/303; G10L 15/25; G10L 25/93; H04R 5/033
USPC .......................... 381/74, 306, 86, 77, 79, 92
See application file for complete search history.

(56) References Cited

U.S. PATENT DOCUMENTS

| | | | |
|---|---|---|---|
| 5,987,142 A | 11/1999 | Courneau et al. | |
| 8,682,004 B2* | 3/2014 | Grigsby | G08G 1/0962 340/435 |
| 9,084,068 B2* | 7/2015 | Abrahamsson | H04S 5/005 |
| 9,084,608 B2* | 7/2015 | Larson | A61B 18/1445 |
| 9,129,515 B2* | 9/2015 | Xiang | G08C 23/02 |
| 9,402,132 B2 | 7/2016 | Park et al. | |
| 9,584,946 B1* | 2/2017 | Lyren | H04S 7/30 |

(Continued)

FOREIGN PATENT DOCUMENTS

DE 10258095 B3 2/2004

OTHER PUBLICATIONS

"Call for Proposals for 3D Audio," ISO/IEC JTC1/SC29/WG11/N13411, Jan. 2013, 20 pp.

(Continued)

*Primary Examiner* — Disler Paul
(74) *Attorney, Agent, or Firm* — Shumaker & Sieffert, P.A.

(57) ABSTRACT

Techniques are described for assisting near distance communications. A first device comprising a receiver, a sensor and a processor may be configured to perform the assisted near distance communication techniques. The receiver may receive, from a second device located within a conversational distance to the first device, monophonic audio data representative of the near distance communication. The sensor may generate a sensor signal representative of spatial information of the near distance communication. The processor may render, based on the spatial information and the monophonic audio data, multi-dimensional audio data in which the near distance communication originates in a soundfield from a location of the second device relative to the first device. The processor may next output the multi-dimensional audio data to a transducer so as to reproduce the near distance communication in multiple dimensions.

31 Claims, 7 Drawing Sheets

(56) References Cited

U.S. PATENT DOCUMENTS

| | | | |
|---|---|---|---|
| 2008/0085686 A1* | 4/2008 | Kalik | G01S 13/931 455/154.1 |
| 2011/0249821 A1 | 10/2011 | Jaillet et al. | |
| 2012/0176865 A1 | 7/2012 | Schwarz et al. | |
| 2014/0079257 A1* | 3/2014 | Ruwe | F21V 21/084 381/309 |
| 2015/0036847 A1 | 2/2015 | Donaldson | |
| 2015/0110285 A1* | 4/2015 | Censo | B60Q 5/006 381/71.4 |
| 2016/0134987 A1* | 5/2016 | Gorzel | H04S 7/304 381/310 |
| 2016/0165342 A1 | 6/2016 | Benattar | |

OTHER PUBLICATIONS

Herre, et al., "MPEG-H 3D Audio—The New Standard for Coding of Immersive Spatial Audio," IEEE Journal of Selected Topics in Signal Processing, vol. 9, No. 5, Aug. 2015, pp. 770-779.

Poletti, "Three-Dimensional Surround Sound Systems Based on Spherical Harmonics," J. Audio Eng. Soc., vol. 53, No. 11, Nov. 2005, pp. 1004-1025.

"Information technology—High efficiency coding and media delivery in heterogeneous environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 pp.

"Information technology—High efficiency coding and media delivery in heterogeneous environments—Part 3: 3D Audio," ISO/IEC JTC 1/SC 29N, ISO/IEC CD 23008-3, Apr. 4, 2014, 337 pp.

"Information technology—High efficiency coding and media delivery in heterogeneous environments—Part 3: 3D Audio," ISO/IEC JTC 1/SC 29, ISO/IEC DIS 23008-3, Jul. 25, 2014, 311 pp.

"Is Apple Working on Augmented Reality Headset? Ex-Microsoft's Chief HoloLens Audio Engineer's LinkedIn Provides a Clue," Aug. 31, 2015, retrieved from http://www.techtimes.com/articles/80984/20150901/is-apple-working-on-augmented-reality-headset-ex-microsofts-chief-hololens-audio-engineers-linkedin-provides-a-clue.htm, 2 pp.

Pulkki, "Virtual Sound Source Positioning Using Vector Base Amplitude Panning," Audio Engineering Society, vol. 45, No. 6, Jun. 1997, pp. 456-466.

"IEEE Std 802.11-2012, Part 11: Wireless LAN Medium Access Control (MAC) and Physical Layer (PHY) Specifications," IEEE Standards Association, Mar. 29, 2012, 2793 pp.

"IEEE Std 802.15.1, Part 15.1: Wireless medium access control (MAC) and physical layer (PHY) specifications for wireless personal area networks (WPANs)," IEEE Standards Association, Revision of IEEE Std. 802.15.1-2002; 2005, 600 pp. (Applicant points out, in accordance with MPEP 609.04(a), that the year of publication, 2005, is sufficiently earlier than the effective U.S. filing date Sep. 8, 2016, so that the particular month of publication is not in issue.)

* cited by examiner

ASSISTED NEAR-DISTANCE COMMUNICATION USING BINAURAL CUES

TECHNICAL FIELD

The disclosure relates to audio signal processing and, more specifically, audio signal processing for near distance communication.

BACKGROUND

Increasing use of mobile devices, such as cellular phones (including so-called "smart phones"), has led to various wearable devices that facilitate interaction with the mobile devices. One such wearable device is a headset, which may communicate with the mobile device via a wired connection or wireless connection (e.g., established in accordance with Bluetooth™ or other wireless personal area network protocols). The headset may provide one or more transducers (such as a microphone or speaker) for capturing and reproducing soundfields, thereby facilitating voice interaction with the mobile device.

Headsets are often employed to facilitate playback of music or other media audio content to avoid disturbing others in public places. Headsets are also used to provide some measure of privacy during voice or video teleconferences, while potentially improving capture and playback of audio content in comparison to using the mobile device alone.

SUMMARY

In general, this disclosure describes techniques for utilizing a headset (or other wearable device capable of capturing audio data representative of a soundfield and reproducing the soundfield based on captured audio data) to facilitate near-distance communication. Near-distance communication may refer to communication between two or more human speakers that are located within normal conversational hearing distance from one another (and usually within sight of one another).

A first mobile device (or other portable device, such as a laptop computer, tablet computer, etc.) may interface with the headset (or other wearable device having two or more transducers, e.g., left and right speakers and left and right microphones) to reproduce, in two or three dimensions, a soundfield captured by a second mobile device so as to recreate a conversational or near distance communication in the presence of relatively high ambient noise levels with spatial accuracy. In other words, the first mobile device may employ one or more sensors to identify a location of the second mobile device relative to the first mobile device and reproduce the soundfield to place the soundfield captured by the second mobile device within the soundfield at the identified location. In this respect, operations of the first and second mobile device may conduct a near-distance communication, both in the presence of noisy environments or entities, such as a bar, restaurant, sports arena, vehicle, or the like.

In one example, a first device comprising a receiver, a sensor and a processor may be configured to perform the assisted near distance communication techniques. The receiver may receive, from a second device located within a conversational distance to the first device, monophonic audio data representative of the near distance communication. The sensor may generate a sensor signal representative of spatial information of the near distance communication. The processor may render, based on the spatial information and the monophonic audio data, multi-dimensional audio data in which the near distance communication originates in a soundfield from a location of the second device relative to the first device. The processor may next output the multi-dimensional audio data to a transducer so as to reproduce the near distance communication in multiple dimensions.

In another example, a method for assisting near distance communication comprises receiving, by a first device and from a second device located within a conversational distance from the first device, monophonic audio data representative of the near distance communication, and generating, by one or more sensors of the first device, a sensor signal representative of spatial information of the near distance communication. The method also comprises rendering, by the first device and based on the spatial information and the monophonic audio data, multi-dimensional audio data in which the near distance communication originates from a location of the second device relative to the first device, and outputting, by the first device, the multi-dimensional audio data to a transducer so as to reproduce the near distance communication in multiple dimensions.

In a further example, a first device configured to assist near distance communication comprises means for receiving, from a second device located within a conversational distance to the first device, monophonic audio data representative of the near distance communication, and means for generating sensor signals representative of spatial information of the near distance communication. The first device also comprises means for rendering, based on the spatial information and the monophonic audio data, multi-dimensional audio data in which the near distance communication originates in a soundfield from a location of the second device relative to the first device, and means for outputting the multi-dimensional audio data to a transducer so as to reproduce the near distance communication in multiple dimensions.

In another example, a non-transitory computer-readable storage medium having stored thereon instructions that, when executed, cause one or more processors of a first device to receive, from a second device located within a conversational distance to the first device, monophonic audio data representative of near distance communication, obtain, from one or more sensors of the first device, sensor signals representative of spatial information of the near distance communication, render, based on the spatial information and the monophonic audio data, multi-dimensional audio data in which the near distance communication originates in a soundfield from a location of the second device relative to the first device, and output the multi-dimensional audio data to a transducer so as to reproduce the near distance communication in multiple dimensions.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
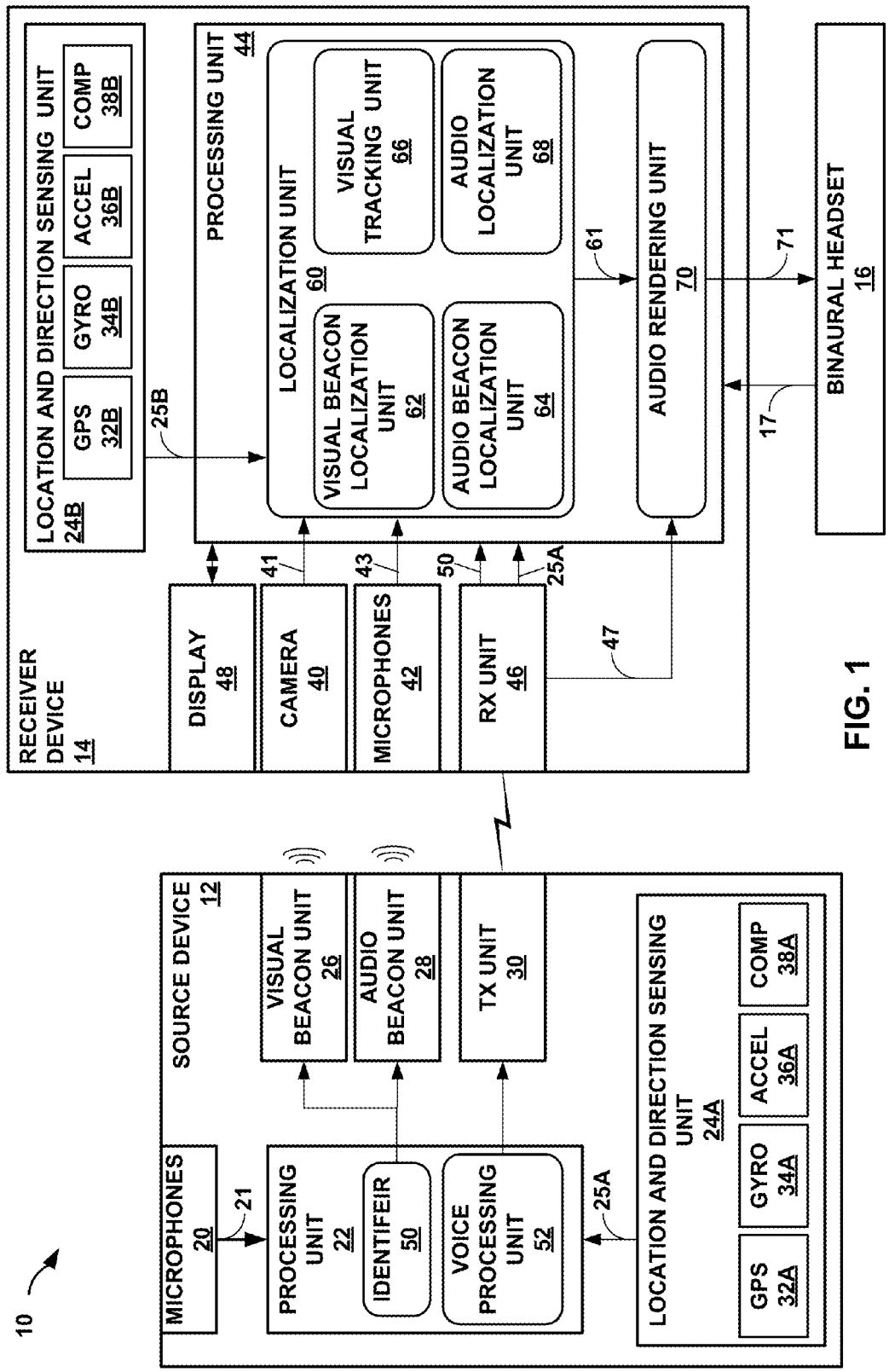
FIG. 1 is a block diagram illustrating an example system configured to perform various aspects of the assisted near distance communication techniques described in this disclosure.

This disclosure describes techniques for providing a way by which to utilize a headset (or other wearable device capable of obtaining audio data representative of a soundfield and reproducing the soundfield based on captured audio data) to facilitate near-distance communication. Near-distance communication may refer to communication between two or more speakers that are located within normal conversational hearing distance from one another (and usually within sight of one another). Examples of near-distance communication may include communication by speakers around a table (such as at a restaurant), communication by speakers located in the same car, or communication by speakers arranged in a row next to one another at a sporting event.

Speakers may refer to human persons. Speakers may conduct conversations with one person speaking and one person listening, two persons speaking and the same persons listening, or a first subset or all of a plurality of persons speaking and a second subset or all of the plurality of persons listening, where the first and second subsets may be the same or different.

The techniques of this disclosure may be employed in contexts having high ambient noise levels relative to normal conversational sound levels. Normal conversational sound levels may include 60-65 decibels (dB) at approximately three feet from a given speaker. High ambient noise levels may therefore exceed, as one example, 60-65 dB. Example contexts in which high ambient noise levels may impact normal conversation include a restaurant (due to other patrons, music, etc.), a car (due to traffic, wind, road conditions, traveling speed, etc.) or a sports arena (due to cheering, music, announcers, etc.).

In contexts having high ambient noise levels that exceed normal conversational levels, it may be difficult to communicate with remaining members of a group set in the same context. Although headsets have been employed in a number of different contexts having high ambient noise levels to facilitate communication, these headsets or other wearable devices often fail to adequately represent the soundfield with sufficient spatial resolution to accommodate near distance communication.

For example, pilots employ headsets to facilitate communication with co-pilots, air traffic controllers, and passengers given the high ambient noise levels produced by the airplane. The headsets used by pilots generally capture audio data representative of a soundfield (e.g., the voice of the pilot) using a monophonic audio format having a single channel. The headsets of co-pilots or air traffic controllers or the speakers in the flight cabin of the airplane reproduce the soundfield by playing the mono-formatted audio data without any sort of spatial, binaural, or other audio cues. As such, the headsets do not capture audio data with sufficient spatial resolution to enable audio playback sufficient to recreate a soundfield suited for near distance communication or, in other words, conversational communication.

In accordance with the techniques described in this disclosure, a first mobile device (or other portable device, such as a laptop computer, tablet computer, etc.) may interface with a wearable device having two or more transducers (e.g., left and right speakers and left and right microphones) to reproduce, in two or three dimensions, a soundfield captured by a second mobile device so as to recreate a conversational or near distance communication in the presence of relatively high ambient noise levels. Although described as being performed by a mobile device interfacing with a wearable device, a single housing may include both the mobile device and the wearable device (e.g., so-called "smart glasses" or augmented reality glasses). Assisted The first mobile device may receive a mono voice signal from the second mobile device and recreate the near distance communication in a number of different ways. In one example, the first mobile device may perform acoustic delay finding in which a binaural delay of an actual acoustic voice of an active speaker operating the second mobile device to the left and right speakers of the wearable device worn by the listener operating the first mobile device is determined. The first mobile device may next apply the delays to the mono voice audio data to generate a two or three dimensional representation of the mono voice audio data, which may more accurately recreate the near distance communication soundfield.

FIG. 1 is a block diagram illustrating an example system 10 configured to perform various aspects of the assisted near distance communication techniques described in this disclosure. As shown in the example of FIG. 1, the system 10 includes a source device 12 and a receiver device 14. The source device 12 may represent a mobile handset (such as a mobile phone, so-called "smart" phone, so-called "tablet" phone, or any other type of mobile communication device), tablet computer, laptop computer, personal computer, or any other type of device capable of capturing audio data during near distance communications. Receiver device 14 may also represent a mobile handset, tablet computer, laptop computer, personal computer, or any other type of device capable of interfacing with a binaural headset 16 to reproduce the near distance communication.

Although shown in the example of FIG. 1 as being dedicated source and receiver devices 12 and 14, the source device 12 may also operate as a receiver, while the receiver device 14 may operate as a source. As such, operations described as being performed by the source device 12 may be performed by the receiver device 14 using similar units as those described as performing such source operations, while operations described as being performed by receiver device 14 may be performed by the source device 12 using similar units as those described as performing such receiver operation.

The source device 12 includes one or more microphones 20, a processing unit 22, location and direction sensing unit 24A, a visual beacon unit 26, an audio beacon unit 28, and a transmission (TX) unit 30. The microphones 20 may each include a transducer configured to convert pressure waves into audio signals 21. The microphones 20 may output the audio signals 21 to the processing unit 22.

The processing unit 22 may represent one or more processors, which may comprise fixed function processing circuitry, programmable processing circuitry, or a combination of fixed function and programmable processing circuitry. The processors may include one or more digital signal processors (DSPs), general purpose microprocessors, application specific integrated circuits (ASICs), field programmable logic arrays (FPGAs), or other equivalent integrated or discrete logic circuitry. When not implemented as dedicated hardware alone, the processing unit 22 may also include a memory to which the processors are coupled. The memory may be configured to store instructions that, when executed, cause the processors to perform operations attributed in this disclosure as being performed by the processing unit 22. The memory may, in some examples, represent a non-transitory computer-readable storage memory.

The location and direction sensing unit 24A may represent a unit configured to determine a location and a direction of the source device 12. The location and direction sensing unit 24A may include, to provide a few examples, a global positioning system (GPS) unit 32A ("GPS 32A"), a gyroscope unit 34A ("GYRO 34A"), an accelerometer unit 36A ("ACCEL 36A"), and a compass unit 38A ("COMP 38A").

The GPS unit 32A may determine the location of the source device 12, providing the location of the source device 12 as GPS coordinates. The gyroscope unit 34A may provide information indicative of a change in movement of the source device 12 from which the direction in which the source device 12 is facing may be derived. The accelerometer unit 34A may also provide information indicative of a change in movement of the source device 12 from which the direction in which the source device 12 is facing may be derived. The compass unit 38A may represent a unit configured to provide a magnetic cardinal direction in which the source device 12 is oriented. The location and direction sensing unit 24A may employ any combination of units 32A-38A to generate location and movement information 25. The location and direction sensing unit 24A may output the location and movement information 25A to the processing unit 22.

The visual beacon unit 26 may represent any type of unit configurable to output a signature light beacon. The visual beacon unit 26 may, as one example, represent a light emitting diode (LED). The visual beacon unit 26 may be used for other purposes, e.g., as a camera flash, or incorporated into other units, such as a camera unit, that are not shown as being included by the source device 12 in the example of FIG. 1 for ease of illustration purposes.

The audio beacon unit 26 may represent any type of unit configurable to output a signature audio beacon. The audio beacon unit 26 may, as one example, represent a speaker configured to reproduce a soundfield from an audio signal. In some examples, the audio beacon unit 26 may represent a speaker configured to emit ultrasound frequencies (referring to frequencies higher than the upper bound of human hearing, or generally 20 kilo Hertz (kHz) or higher).

The transmission unit 30 ("TX unit 30") may represent a unit configured to modulate data for delivery via wired or wireless transmission. The transmission unit 30 may operate in accordance with standard cellular wireless transmission standards, such as Global System for Mobile Communications (GSM), Interim Standard 95 (IS-95), Universal Mobile Telecommunications Systems (UMTS), code division multiple access 2000 (CDMA2000), and/or long term evolution (LTE). The transmission unit 30 may represent a unit configured, either as an alternative to or in combination with the cellular wireless transmission, to operate in accordance with other forms of wireless protocols, such as any combination of the Institute of Electrical and Electronics Engineers (IEEE) 802.11 standards, such as IEEE 802.11a, IEEE 802.11b, IEEE 802.11g, IEEE 802.11n, IEEE 802.11ac, etc. The transmission unit 30 may also, in some examples, represent a unit configured, either as an alternative to or in combination with one or more of the foregoing wireless transmission standards, to communicate wirelessly via personal area networks, such as those established using IEEE 802.15.1 (Bluetooth™), and the like. The transmission unit 30 may, in this respect, represent a unit configured to communicate either wirelessly or via wired connection with receiver device 14.

As further shown in the example of FIG. 1, the receiver device 14 may include a location and direction sensing unit 24B, a camera 40, one or more microphones 42, a processing unit 44, a receiver unit 46 ("RX unit 46"), and a display 48. The location and direction sensing unit 24B may be similar to the location and direction sensing unit 24A, including any combination of one or more of a GPS unit 32B, gyroscope unit 34B, accelerometer unit 36B, and/or compass unit 38B.

The camera unit 40 may represent a unit configured to capture image data and/or video data. The microphones 42 may be substantially similar to microphones 20, while the processing unit 44 may be substantially similar to processing unit 22. The receiver unit 46 may represent a unit configured to operate reciprocally to the transmission unit 30 in order to receive a bitstream (e.g., that specifies a monophonic audio signal). The display 48 may represent a unit configured to display generated or captured image or video data. The display 48 may comprise a light emitting diode (LED) display, organic LED (OLED) display or any other type of display by which to display generated or captured image or video data.

In accordance with the techniques described in this disclosure, the receiver device 14 may interface with a wearable device (i.e., the binaural headset 16 shown in FIG. 1) having two or more transducers (e.g., left and right speakers and left and right microphones) to reproduce, in two or three dimensions, a soundfield captured by the sender device 12 so as to recreate a conversational or near distance communication in the presence of relatively high ambient noise levels within a defined location. The source device 12 and the receiver device 14 may, when located in the same noisy environment, context or entity (and potentially proximate to one another within a same room, venue, or general location), assist a near distance communication in the noisy environment, context or entity, potentially preserving the multidimensional nature of such near distance communications. Although described as being performed by the receiver device 14 interfacing with the headset 16, a single housing may include both the mobile device and the wearable device (e.g., so-called "smart glasses" or augmented reality glasses).

In operation, the sender device 12 may be configured to capture, via the microphones 20, audio data representative of a near distance communication by a first operator of the sender device 12 directed to a second operator of the receiver device 14. The microphones 20 may output the audio data 21 to the processing unit 22. The processing unit 22 may receive the audio data 21 and process the audio data 21 to generate monophonic audio data 47.

In some contexts, the processing unit 22 may invoke voice processing unit 52 to perform various operations with respect to the captured audio data 21. The voice processing unit 52 may apply adaptive noise cancellation (ANC) with respect to the captured audio data 21 to block environmental noise and direct the acoustic voice of the speaker. In some examples, the captured audio data 21 may comprise a number of separate audio signals, each of which is captured by a separate one of microphones 20, and some of which may represent environmental audio data. The voice processing unit 52 may utilize the number of separate audio signals (including those representative of environmental audio data) when performing the ANC. More information regarding ANC can be found in U.S. Pat. No. 9,402,132, entitled "LIMITING ACTIVE NOISE CANCELLATION OUTPUT," issued Jul. 26, 2016. Although described with respect to ANC, the techniques may be performed with respect to any form of noise cancellation, including wind cancellation, road noise cancellation, and the like. The voice processing unit 52 may convert the captured audio data 21 into the monophonic audio data 47.

The voice processing unit 52 may also perform voice processing with respect to the audio data 21 in order to determine a location of the operator relative to the source device 12. The processing unit 22 may also receive location and direction information 25A from the location and direction sensing unit 24A, where the location and direction information 25A may identify a location and direction of the source device 12. The processing unit 22 may update the location and direction information 25A based on the determined location of the operator of the source device 12 relative to the source device 12 itself so as to enable the receiver device 14 to better determine a location of the operator of the source device 12 relative to the operator of the receiver device 14.

In some instances, microphones 20 may be incorporated into a headset similar to binaural headset 16. The headset, in this instance, may also incorporate a location and direction sensing unit similar to location and direction sensing unit 24A. The headset location and directions sensing unit may output location and direction information that processing unit 22 may utilize to update the location and direction information 25A so as to account for the positioning of the head of the operator of the source device 12.

The processing unit 22 may tag or otherwise associate the location and direction information 25A with the audio data 21. In some instances, the processing unit 22 may formulate a bitstream that includes the monophonic audio data to also include the GPS coordinates from the location and direction information 25A. The processing unit 22 may output the bitstream to the transmission unit 30 for transmission to the receiver device 14.

Additionally, the processing unit 22 may interface with the visual beacon unit 26, the audio beacon unit 28, or both the visual beacon unit 26 and the audio beacon unit 28. The processing unit 22 may interface with visual beacon unit 26 to emit a signature light beacon based on an identifier 50. The processing unit 22 may generate or otherwise be configured with (such as through input by the first operator of the source device 12) the identifier 50. The identifier 50 may uniquely identify the source device 12 within what may be a plurality of devices (not shown in FIG. 1 for ease of illustration purposes) communicating with the first device via near distance communications. Likewise, the processing unit 22 may interface with audio beacon unit 28 to emit a signature audio beacon based on the identifier 50.

In some examples, the processing unit 22 may invoke the voice processing unit 52 to generate the identifier 50 based on speech derived information. That is, the voice processing unit 52 may analyze the audio signals 21 to generate the unique identifier 50 from characteristics of the audio signals 21 themselves.

The processing unit 21 may, in either instances, modulate the audio or light (or, in other words, visual) beacon based on the identifier 50. The processing unit 22 may also formulate the bitstream to include the identifier 50 to thereby permit the receiver device 14 to associate the signature audio and/or light beacons with the bitstream including the monophonic audio data. The processing unit 22 may interface with the transmission unit 30 to output the bitstream to the receiver device 14.

The receiver unit 46 of the receiver device 14 receives the bitstream from the sender device 12. The receiver unit 46 may extract the monophonic audio data from the bitstream, outputting the monophonic audio data to the processing unit 44 as monophonic audio data 47. The receiver unit 46 may additionally output, when included in the bitstream, the identifier 50, and the location and direction information 25A (or portions thereof, such as the GPS coordinates).

The processing unit 44 may also receive, from the location and direction sensing unit 24B, location and direction information 25B indicative of a location and a direction of the receiver device 14. The processing unit 44 may further receive, similar to that described above with respect to the headset incorporating microphones 20, additional location and direction information from the binaural headset 16 indicating an orientation of the head of the operator of the receiver device 14. The processing unit 44 may update the location and direction sensing information 25B based on the location and direction information from the binaural headset 16.

The processing unit 44 may also interface with the camera 40 to capture video data 41, the microphones 42 to capture audio data 43, or both the camera 40 and the microphones 42 in order to capture both the video data 41 and the audio data 43. The processing unit 44 may invoke the localization unit 60 to process the video data 41 and/or the audio data 43 in order to identify a location of the operator of the source device 12 based on one or both of the signature light beacon emitted by the visual beacon unit 26 or the signature audio beacon emitted by the audio beacon unit 28.

The localization unit 60 may include a visual beacon localization unit 62. The visual beacon localization unit 62 may represent a unit configured to analyze the video data 41 in order to identify the visual beacon emitted by the visual beacon unit 26.

The visual beacon localization unit 62 may perform any form of image analysis to identify the signature light beacon. The visual beacon localization unit 62 may receive the identifier 50 from the receiver unit 46 and generate a visual beacon associated with the source device 12, performing the image analysis to identify the generated visual beacon in the captured video data 41. When the identifier 50 is not provided in the bitstream, the visual beacon localization unit 62 may access the monophonic audio signal 47 in order to determine speech derived information that forms the basis for the unique identifier 50. The visual beacon localization unit 62 may next generate the audio beacon based on the generated identifier 50, performing the image analysis to identify the generated visual beacon in the captured video data 41.

The visual beacon localization unit 62 may perform any form of visual analysis (e.g., using computer vision) to identify the signature light beacon. Upon detecting the generated visual beacon in the captured video data 41, the visual beacon localization unit 62 may output an indication that the visual beacon was detected.

The localization unit 60 may include an audio beacon localization unit 64. The audio beacon localization unit 64 may represent a unit configured to analyze the audio data 43 in order to identify the audio beacon emitted by the audio beacon unit 28.

The audio beacon localization unit 64 may receive the identifier 50 from the receiver unit 46 and generate an audio beacon associated with the source device 12, performing the auditory analysis to identify the generated audio beacon in the captured audio data 43. When the identifier 50 is not provided in the bitstream, the audio beacon localization unit 64 may access the monophonic audio signal 47 in order to determine speech derived information that forms the basis for the unique identifier 50. The audio beacon localization unit 64 may next generate the audio beacon based on the generated identifier 50, performing the image analysis to identify the generated visual beacon in the captured audio data 43.

The audio beacon localization unit 64 may perform any form of auditory analysis (e.g., using computational auditory scene analysis) to identify the signature audio beacon. Upon detecting the generated audio beacon in the captured audio data 43, the audio beacon localization unit 64 may output an indication that the audio beacon was detected.

The localization unit 60 may also invoke visual tracking unit 66 to analyze captured video data 41. The visual tracking unit 66 may represent a unit configured to perform face tracking, lip tracking, or both face tracking and lip tracking, as well as, any other form of visual tracking. Visual tracking unit 66 may perform visual tracking with respect to the captured video data 41 in order to identify a location and direction (or orientation) of the operator of the source device 12.

The localization unit 60 may also invoke audio localization unit 68 to analyze captured audio data 43. The audio localization unit 68 may represent a unit configured to perform audio localization with respect to the captured audio data 43 in order to identify a location and direction (or orientation) of the operator of the source device 12. The audio localization unit 68 may determine a location and direction of the operator of the source device 12 by, as one example, detecting speech having a level of correlation (e.g., above some threshold) with monophonic audio data 47.

Although described with respect to captured audio data 43, the audio localization unit 68 may perform similar techniques for identifying a location and direction of the operator of the source device 12 using audio data 17 captured by microphones on the left and right ears of the binaural headset 16. The audio localization unit 68 may perform acoustic delay finding in which a binaural delay of an actual acoustic voice of the operator of the sender device 12 to the left and right microphones of the binaural headset 16 worn by the listener operating the receiver device 14 is determined.

For example, when the microphone delay to the left microphone is denoted mathematically as 'p' and the right microphone delay is denoted mathematically as 'q', the audio localization unit may determine a binaural delay of 'p' and 'q,' which may then be used to derive a relative location 61. The relative location 61 in this example may be defined by a binaural delay to the right and left speakers of binaural headset 16. The delays 'p' and 'q' may define a direction of arrival. The audio localization unit 61 may approximate distance by subtracting a further static delay denoted mathematically as 'k' from both the right and left speaker delays (i.e., p and q in this example).

The audio localization unit 68 may also analyze the captured audio data 43 for an ultrasound audio signal emitted by the source device 12 so as to identify a location of the source device 12. The audio localization unit 68 may identify the location based on detection of the ultrasound audio signal in the manner described in more detail in U.S. Pat. No. 9,129,515, entitled "ULTRASOUND MESH LOCALIZATION OF INTERACTIVE SYSTEMS," issued Sep. 8, 2015. The audio localization unit 68 may output the location and direction of the operator of the source device 12, the location and direction of the source device 12, or the location and direction of both the operator of the source device 12 and the source device 12 itself.

The localization unit 60, upon receiving the indication that the visual beacon was detected, the audio beacon was detected, or both the visual and audio beacons were detected, determine a location of the operator of the source device 12 relative to the operator of the receiver device 14. The localization unit 60 may determine the relative location based on one or more of the location and direction information 25A and the location and direction information 25B at approximately the same time as the indication that the visual beacon was detected. The localization unit 60 may update the location of the source device 12 relative to the receiver device 14 using the location and direction of the operator of the source device 12 output by the visual tracking unit 66, the location and the direction of the operator of the source device 12 output by the audio localization unit 68, the location and direction of the source device 12 output by the audio localization unit 68, or any combination of the foregoing locations. The localization unit 60 may output the relative location to an audio rendering unit 70 of the processing unit 44 as relative location 61 (e.g., defined in terms of a direction of arrival and a distance between the source and receiver devices).

In this way, one or more sensors, such as any combination of the camera 40, the microphones 42, the GPS unit 32B, the gyroscope unit 34B, the accelerometer 36B, and the compass unit 38B, may generate sensor signals representative of spatial information of the near distance communication. The localization unit 60 may then process the sensor signals to derive or otherwise obtain the relative location 61 (e.g., defined in terms of a direction of arrival and a distance between the source and receiver devices).

The processing unit 44 may next invoke audio rendering unit 70, which may represent a unit configured to render, from the monophonic audio data 47, multi-dimensional audio data 41 for driving binaural headset 16. The audio rendering unit 70 may perform vector base amplitude panning (VBAP) to create the multi-dimensional audio data 41 that allows for placing of the monophonic audio data 47 in the soundfield representative of a recreation of the near distance communication such that monophonic audio data 47 appears to originate from the relative location 61 (e.g., defined in terms of a direction of arrival and a distance between the source and receiver devices). More information regarding VBAP can be found in a publication by V. Pulkki, entitled "Virtual Sound Source Positioning Using Vector Base Amplitude Panning," at page 456-466 of the Journal of Audio Engineering Society, Vol. 45, No. 6, June, 1997.

The audio rendering unit 70 may also perform some form of binaural audio rendering, either in conjunction with or as an alternative to VBAP. Binaural audio rendering may involve application of head related transfer function (HRTFs), which represent transfer functions that model how the human audio system works as measured by microphones placed in a simulated human head. The HRTFs may, in other words, describe how a sound from a specific point will arrive at a listener's ear. The audio rendering unit 70 may apply the HRTFs to the monophonic audio data 41 itself or to multi-channel audio data generated through application of the VBAP to the monophonic audio data 41. The HRTFs may output two speaker feeds, which are denoted as multi-dimensional audio data 71 in the example of FIG. 1. The two speaker feeds may drive the left and right speakers of binaural headset 16.

In this respect, the processing unit 44 may configure audio rendering unit 70 to render the multi-dimensional audio data 71 and output the multi-dimensional audio data 71 to a transducer (e.g., of the binaural headset 16) such that the binaural headset 16 may reproduce the near distance communication in a manner that the operator of the source device 12 appears to be speaking from the determined location 61 relative to the receiver device 14. The audio rendering unit 70 may output the multi-dimensional audio data 71 to transducers of binaural headset 17 so as to reproduce the near distance communication in multiple dimensions.

Figure 2A:
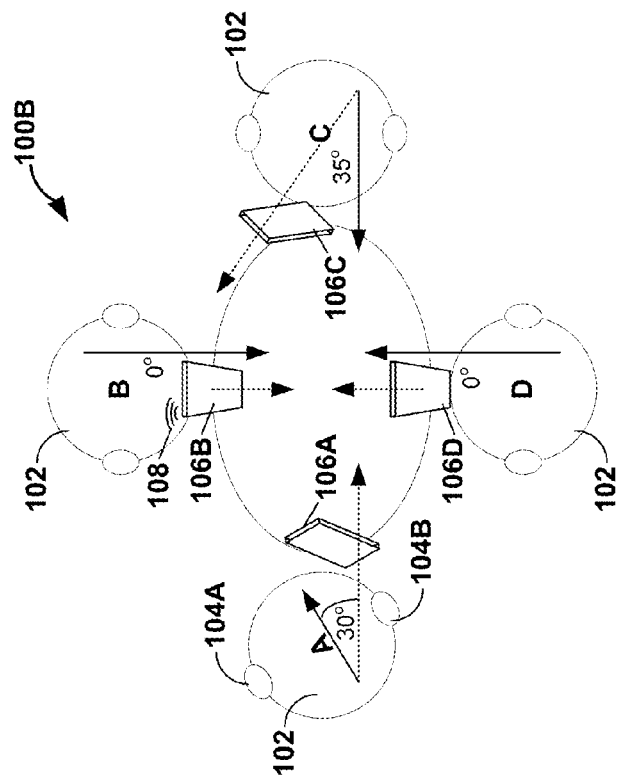
FIGS. 2A-2B are diagrams illustrating an example of near distance communication conducted in accordance with the assistance of the techniques described in this disclosure.
Figure 2B:
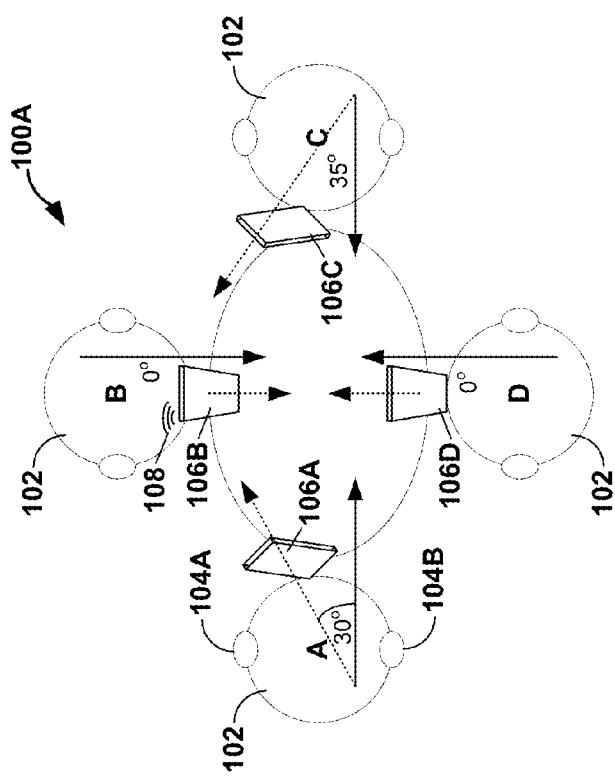

FIGS. 2A-2B are diagrams illustrating an example near distance communication 100 conducted in accordance with the assistance of the techniques described in this disclosure. In the example of FIG. 2A, a number of different operators 102A-102D ("operators 102") are participating in a first phase 100A of the near distance communication 100. Each of operators 102 are wearing binaural headsets 16 including left and right speakers 104A and 104B (where only the left and right speakers (which may also be referred to as transducers) 104A and 104B are explicitly denoted with respect to the operator 102A for ease of illustration purposes).

Each of the operators 102 is also employing one of mobile devices 106A-106D ("mobile devices 106"), which may represent one of either the source device 12 or the receiver device 14 depending on whether the one of the operators 102 is actively speaking or listening to the active speaker. Again, although described as being separate device, i.e., the source device 12 and the receiver device 14 in this disclosure, any given device may include the functionality described with respect to both the source device 12 and the receiver device 14. In the example of FIG. 2A, operator 102B is assumed to be actively speaking, while the operators 102A, 102C, and 102D are assumed to be listening to the operator 102B. In this example, the near distance communication 100 may represent a near distance communication occurring in a restaurant having high levels of ambient noise.

Each of the mobile devices 106 may be communicatively coupled to the headsets 16 (which is not shown in FIGS. 2A and 2B, but refers back to FIG. 1). As described above, each of headsets 16 may output to the corresponding one of the mobile devices 106 a direction and/or orientation indicating to which direction each one of the headsets 16 is facing. Each of mobile devices 106A, 106C and 106D may also compute a relative direction 61 (e.g., defined in terms of a direction of arrival and a distance between the source and receiver devices) as a function of the respective one of the headset directions and one or more of the location and direction of mobile device 106B and the location and direction of the actively speaking operator 102B. In the example of FIG. 2A, the solid lined arrow denotes the direction of the headset 16, while the dashed lined arrow denotes the location and direction of the mobile device 106B of the actively speaking operator 102B.

When establishing the near distance communication 100, each of the operators 102 may configure the near distance communication 100 to use any combination of the foregoing ways by which to determine the relative location 61 (e.g., defined in terms of a direction of arrival and a distance between the source and receiver devices). For example, the operator 102A may elect to use ultrasound and/or camera based localization of the one of the mobile device 106 of the active speaker (i.e., the mobile device 106B in the example of FIG. 2A).

The operator 102A may interface with mobile device 106A to configure the localization unit 60 to invoke both visual beacon localization unit 62 and audio beacon localization unit 64. Audio beacon localization may provide an omni-directional form of localization (meaning that audio beacon localization may localize independent of the direction in which the mobile device 106A is facing), but may suffer from a coarse spatial resolution (in comparison to visual beacon localization). The visual beacon localization may provide high spatial resolution (in comparison to audio beacon localization) but suffer from a limited field of view. In combination, using audio and visual beacon localization together may provide both omni-directional localization that may provide high spatial resolution.

The mobile device 106A may, as shown in the example of FIG. 2A, locate the audio and visual beacons 108 emitted by source device 106B in the manner described above. The mobile device 106A may then compute a relative location 61 as having an angle of arrival to be approximately 30 degrees from the direction in which the headset 16 is facing. The mobile device 106A may also compute as part of relative location 61 an approximate distance from the mobile device 106A and the mobile device 106B using visual image analysis, auditory analysis or a combination of both visual image analysis and auditory analysis.

In this respect, the mobile device 106A may utilize microphones 42 to capture the audio data 43 having an ultrasound audio signal emitted by the mobile device 106A as one of beacons 108. The mobile device 106A may analyze the ultrasound audio signal to determine the spatial information, e.g., the relative location 61. The mobile device 106A may also utilize the camera 40 to capture the video data 41 having a visual beacon 108. The mobile device 106A may analyze, using the processing unit 44, the video data 41 to determine the signature light beacon 108 emitted by the mobile device 106B to update the spatial resolution of the relative location 61.

The mobile device 106B may, concurrently with the emission of beacons 108, transmit monophonic audio data 47 representative of speech output by the operator 102B. The mobile device 106A may receive the monophonic audio data 47 and configure the audio rendering unit 70 using the relative location 61 so as to render multi-dimensional audio data 71. The audio rendering unit 70 may output the multi-dimensional audio data 71 to the headset 16 such that a transducer of the headset 16 reproduces the near distance communication 100 as if the operator 102B is speaking approximately 30 degrees to the left of the direction in which the operator 102A is facing. The audio rendering unit 70 may output the multi-dimensional audio data 71 to headset 16, which reproduces the soundfield via left and right speakers 104A and 104B.

The mobile device 106C and 106D may perform similar operations to those described above with respect to the mobile device 106A. However, the operators 106C and 106D may select different (or the same) ways by which to discover the relative location of the mobile device 106B or the operator 102B. For example, the operator 106C may configure the mobile device 106C to perform face and/or lip tracking in order to determine the relative location 61. The operator 106C may select face and/or lip tracking in conjunction with headset orientation. The mobile device 106C may determine a relative location 61 having an angle of arrival of 35 degrees to the right of where the operator 106C is facing considering that the operator 106B may be located further back than the mobile device 106B.

The mobile device 106D may, as another example, utilize GPS coordinates in order to determine the relative location 61. The mobile device 106B may output, in the bitstream that includes the monophonic audio data 47, the GPS coordinates of the mobile device 106B. The mobile device 106D may determine the GPS coordinates associated with the current location, comparing the GPS coordinates of the mobile device 106B to the GPS coordinates of the mobile device 106D in order to determine the relative location 61. The relative location 61 may provide the spatial information in terms of the angle of arrival and the distance between the mobile device 106A of the active speaker operator 102B and the mobile device 106D of the listener operator 106D.

As a result of the GPS coordinates being relatively slow to change relative to movement by the operator 106D, the operator 106D may also configure the mobile device 106D to utilize both the headset orientation and the various other sensors of the location and direction sensing unit 24B, e.g., the gyroscope unit 34B, the accelerometer unit 36B, and/or the compass unit 38B, in conjunction with the GPS unit 32B. The gyroscope unit 34B, the accelerometer unit 36B, and/or the compass unit 38B may provide frequent updates (in comparison to GPS coordinate updates) to the localization unit 60 so as to allow for more accurate three-dimensional location information and thereby derive a more accurate relative location 61.

The foregoing may be restated in terms of sender-tracking sensor data and self-tracking sensor data. That is, the mobile device 106B may output, e.g., via the bitstream, sender-tracking sensor data indicating a location (e.g., as GPS coordinates) and a facing direction of the mobile device 106B (e.g., as compass, gyroscopic, and/or accelerometer sensor data). The mobile device 106D may utilize self-tracking sensor data indicating a location (e.g., as a GPS coordinate) and a facing direction of the mobile device 106D (e.g., as compass, gyroscopic, and/or accelerometer sensor data). The mobile device 106D may utilize both the sender-tracking data and the self-tracking data to more accurately localize the mobile device 106B relative to the mobile device 106D. In the example of FIG. 2A, the mobile device 106D is directly in front of the mobile device 106B resulting in an angle of arrival of 0 degrees.

Although described as being used in conjunction with the GPS coordinates, the localization unit 60 may utilize the gyroscope unit 34B, the accelerometer unit 36B, and/or the compass unit 38B sensor data to account for movement of the operators 106A and 106C utilizing the camera and audio beacon localization and the face and/or lip tracking aspects of the techniques. In other words, the localization unit 60 may utilize sensor data from the gyroscope unit 34B, the accelerometer unit 36B, and/or the compass unit 38B to frequently update the relative location 61 determined through audio and visual beacon localization. The localization unit 60 may also utilize sensor data from the gyroscope unit 34B, the accelerometer unit 36B, and/or the compass unit 38B to frequently update the relative location 61 determined through face and/or lip tracking. Again, the techniques described in this disclosure encompass any combination of the various ways by which to arrive at the relative location 61.

FIG. 2B is a diagram illustrating a second phase 100B of the near distance communication 100 in which the head of operator 102A has turned to face the actively speaking operator 102B. In turning to face the actively speaking operator 102B, the operator 102A has moved the mobile device 106A to face the center of the table, thereby moving the field of view to focus on the operator 106C, losing the operator 102B and the corresponding mobile device 106B. In this respect, the visual beacon localization unit 62 invoked by the processing unit 44 of the mobile device 102A may not locate the visual beacon, instead relying on audio beacon localization and the orientation of the headset 16.

The self-tracking sensors of the mobile device 106A may indicate that the mobile device 106A is facing 30 degrees to the left of the headset orientation. The mobile device 102A may update the relative location based on the audio beacon localization and the headset orientation to have a direction of arrival of zero degrees given that the orientation of the source device 106A contradicts the angle of arrival derived through audio beacon localization. The mobile device 102A may render the multi-dimensional audio data 71 from the monophonic audio data 47 using a renderer configured with the computed relative location 61.

Figure 3:
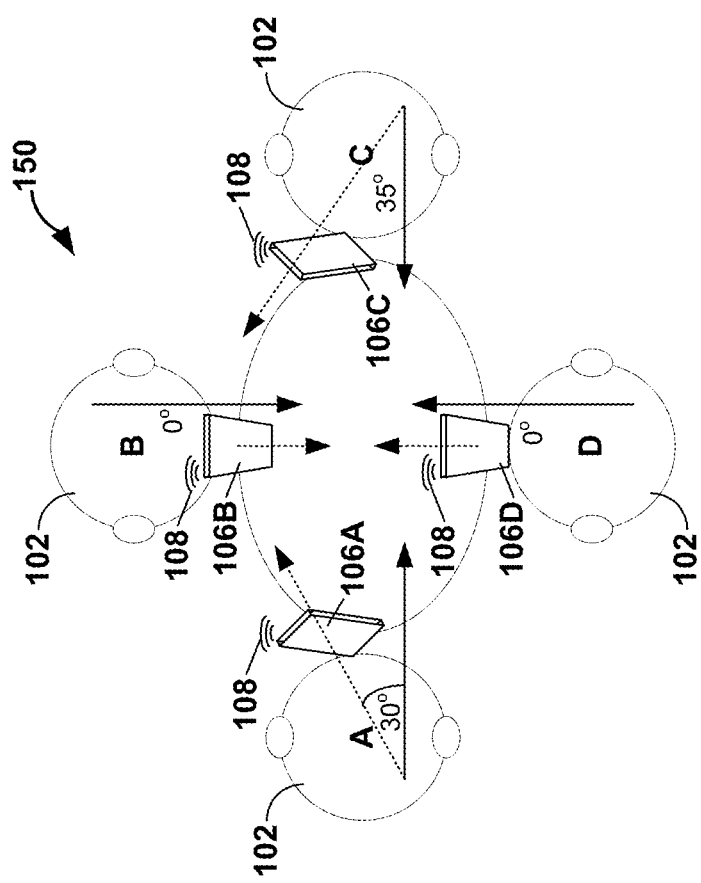
FIG. 3 is another diagram of a near distance communication assisted through application of various aspects of the techniques described in this disclosure.

FIG. 3 is another diagram of a near distance communication 150 assisted through application of various aspects of the techniques described in this disclosure. The near distance communication 150 shown in FIG. 3 may be similar to the near distance communication 100A and 100B shown in the example of FIGS. 2A and 2B, respectively, except that each of the mobile devices 106 emits an audio beacon, a visual or light beacon, or both an audio and a light beacon (where such beacons are shown as "beacons 108"). In the example of FIGS. 2A and 2B, only the mobile device 106B operated by the active speaking operator 102B emitted the beacon.

Each of the beacon 108 may represent a signature beacon 108 unique to each of the respective ones of the mobile device 106. Each of the beacons 108 may enable the mobile devices 106 to correlate monophonic audio data 47 sent by one of the mobile devices 106 with a relative location 61 computed for each of the mobile device 106. The bitstream including the monophonic audio data 47 may specify the identify 50 or the mobile devices 106 may determine the identity based on a level of correlation between the monophonic audio data 47 and each of the detected beacons 108.

In the example of FIG. 3, multiple ones of the operators 102 may speak concurrently with the associated monophonic audio data 47 being identified using the identifier 50 or the above noted correlation. The mobile devices 106 may each individually render the monophonic audio data 47 associated with each active speaking operator 102 at the correspondingly determined relative location 61. The mobile device 106 may, in this respect, compute a relative location 61 for each of the operators 102 and/or the mobile devices 106. The mobile device 106 may configure multiple instances of the renderer with the different relative locations 61 and associate each instance of the renderer with the different monophonic audio data 47 based on the identifiers or the level of correlation. Each of the renderers may output different multi-dimensional audio data 71, which although not shown in the example of FIG. 1, may be mixed to form collective multi-dimensional audio data 71. The audio rendering unit 71 of each of the mobile devices 106 may binaurally render the multi-dimensional audio data 71 for output to each of headsets 16.

Although described with respect to beacons 108 having signature (or, in other words, unique) light beacons, signature audio beacons, or both signature light and audio beacons, the mobile devices 106 may determine correspondence between the monophonic audio data 47 and the relative location 61 in other ways. For example, the mobile devices 106 may perform facial recognition to detect lip movement (or other signatures of voice activity detection, including audio aspects of voice activity detection). Based on the detection of lip movement (or audio emitted by an actively speaking one of the operators 102), the mobile devices 106 may determine that the monophonic audio data 47 is associated with the relative location 61 in which the mobile devices 106 are currently facing to detect the lip movement.

Figure 4:
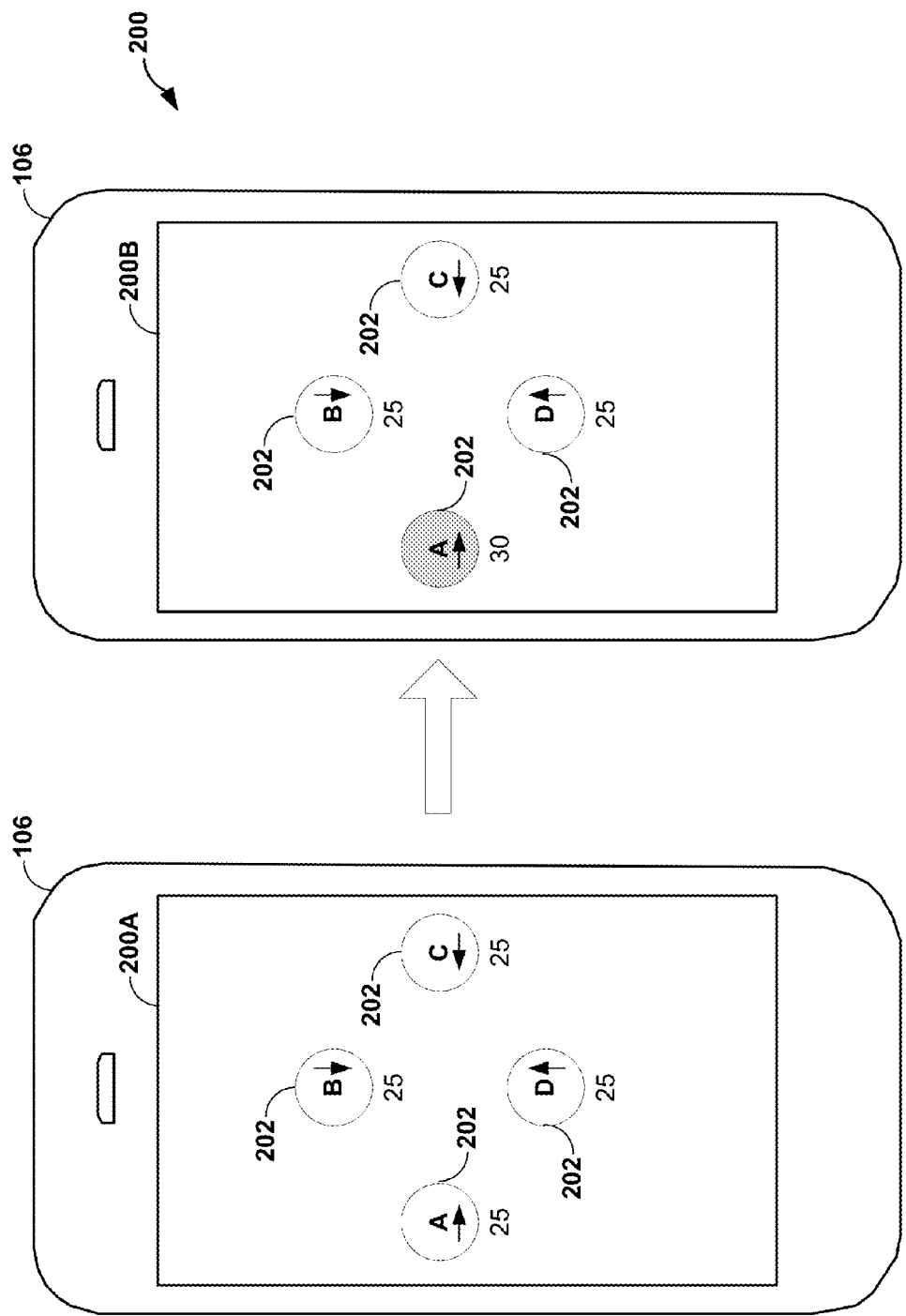
FIG. 4 is a diagram illustrating a user interface presented via the display of one of the mobile devices shown in the examples of FIGS. 2A, 2B and 3 that enable control over the assistance of the near distance communication in accordance with various aspects of the techniques described in this disclosure.

FIG. 4 is a diagram illustrating a user interface 200 presented via the display 48 of one of the mobile devices shown in the examples of FIGS. 2A-3 that enables control over the assistance of the near distance communication 100, 150 in accordance with various aspects of the techniques described in this disclosure. On the left, the display 48 of a mobile device 106 (which may be representative of one of mobile devices 106 shown in FIGS. 2A-3) presents a first instance of the user interface 200, which is denoted as 200A.

In the example instance of the user interface 200A, interface elements 202A-202B ("interface elements 202") each represent a corresponding one of the operators 102. The mobile device 106 positions each of the interface elements 202 at the relative locations 61 from one another. Each interface element 202 may also indicate a direction in which each of the operators 102 are facing (which is shown as an arrow). Below each of the interface elements 202, the mobile device 106 may indicate a volume (or, in other words, gain) at which to render the monophonic audio data 47 from each of the corresponding one of the operators 102. Currently, the user interface instance 200A reflects that a volume of 25 has been assigned to each of the operators 102.

On the right of FIG. 4, a second instance of user interface 200 is shown as user interface instance 200B. In the user interface instance 200B, the mobile device 106 has highlighted interface element 202A where the operator 102 of the mobile device 106 has updated the volume associated with the monophonic audio data 47 associated with the operator 102A. The operator 102 of the mobile device 106 may update the volume by interacting directly with the display 48 (where the display 48 represents a touch-sensitive display).

The operator 102 of the mobile device 106 may also interface with the mobile device 106 using hand gestures. The mobile device 106 may detect hand gestures using the camera 40 or a camera integrated into the headset 16 (both of which may be integrated within an augmented reality headset or the like). The mobile device 106 may, in conjunction with or as an alternative to camera-based detection, detect hand gestures by emitting ultrasound audio signals, capturing the emitted ultrasound audio signals, and analyzing the captured ultrasound audio signals to detect reflections or other disturbances indicative of different hand gestures.

The mobile device 106 may also automatically increase the volume for the monophonic audio data 47 associated with the operator 102A in response to detecting that the operator 102 of the mobile device 106 has focused attention on the operator 102. The mobile device 106 may detect attention focus by determining that the head of the operator 102 has turned in the direction of the operator 102A, eye tracking using the camera 40 or another camera, motion of the mobile device 106 turning toward the operator 102A or any combination of the foregoing.

Figure 5:
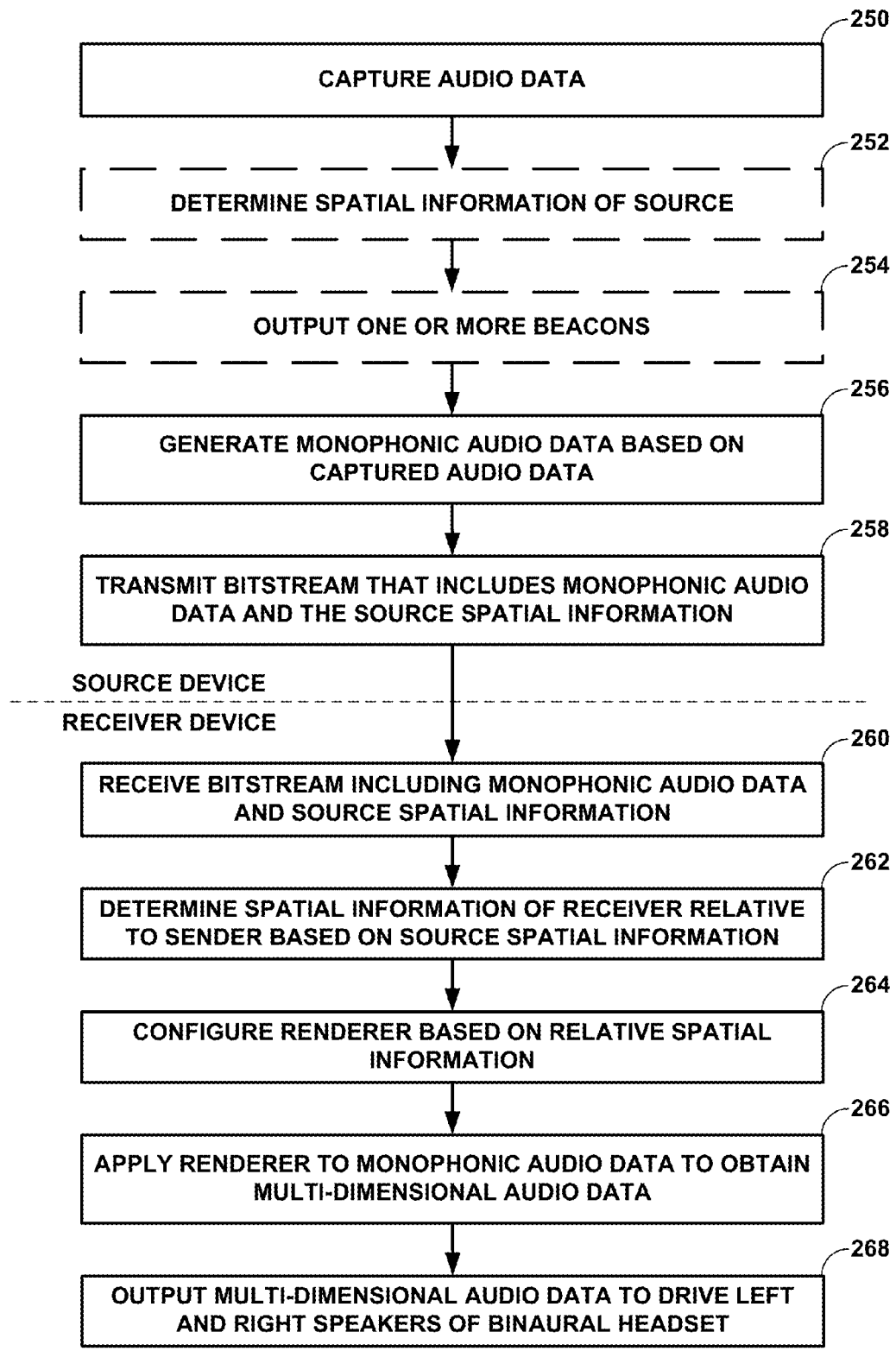
FIG. 5 is a flowchart illustrating example operation of a source device and a receiver device in performing various aspects of the techniques described in this disclosure.

FIG. 5 is a flowchart illustrating example operation of a source device and a receiver device in performing various aspects of the techniques described in this disclosure. A source device, such as the source device 12 shown in the example of FIG. 1, may first capture audio data 21 using microphones 20 (250). The source device 12 may next determine spatial information of the source (e.g., GPS coordinates, or any other aspect of the location and direction information 25A) (252). The source device 12 may also, as described above, emit one or more beacons (254).

Determination of the source spatial information and outputting of beacons may be done based on configurations specified by the operator or pre-configured. The variable nature of such operations is denoted using dashed lines. It is assumed that both of the source spatial information determination and the outputting of beacons is performed in this example.

In any event, the source device 12 may generate monophonic audio data 47 based on the captured audio data 21 (256). The source device 12 may also generate a bitstream that includes the monophonic audio data 47 and the source spatial information 25A. The source device 12 may transmit the bitstream to the receiver device (258).

The receiver device 14 may receive the bitstream including the monophonic audio data 47 and the source spatial information 25A (260). The receiver device 14 may next determine spatial information of receiver relative to sender based on the source spatial information 25A (262). In some examples, the receiver device 14 may determine self-tracking information (which may refer to the location and distance information 25B) and determine the relative information 61 based on both the source spatial information 25A and the self-tracking information 25B. In some examples, the receiver device 14 may determine the relative location 61 based on various combinations of audio and/or visible localization (including those utilizing beacons and those utilizing audio or visual localization without beacons, such as audio localization or face/lip tracking).

The receiver device 14 may configure one or more instances of a renderer (represented by the audio rendering unit 70 in the example of FIG. 1) to render the monophonic audio data 47 based on the relative spatial information (which may be referred to as relative location 61) (264). The receiver device 14 may apply the renderer to the monophonic audio data 47 to obtain the multi-dimensional audio data 71 (266). The receiver device 14 may output the multi-dimensional audio data 71 to drive the left and right transducers of the binaural headset 16 (268).

Figure 6:
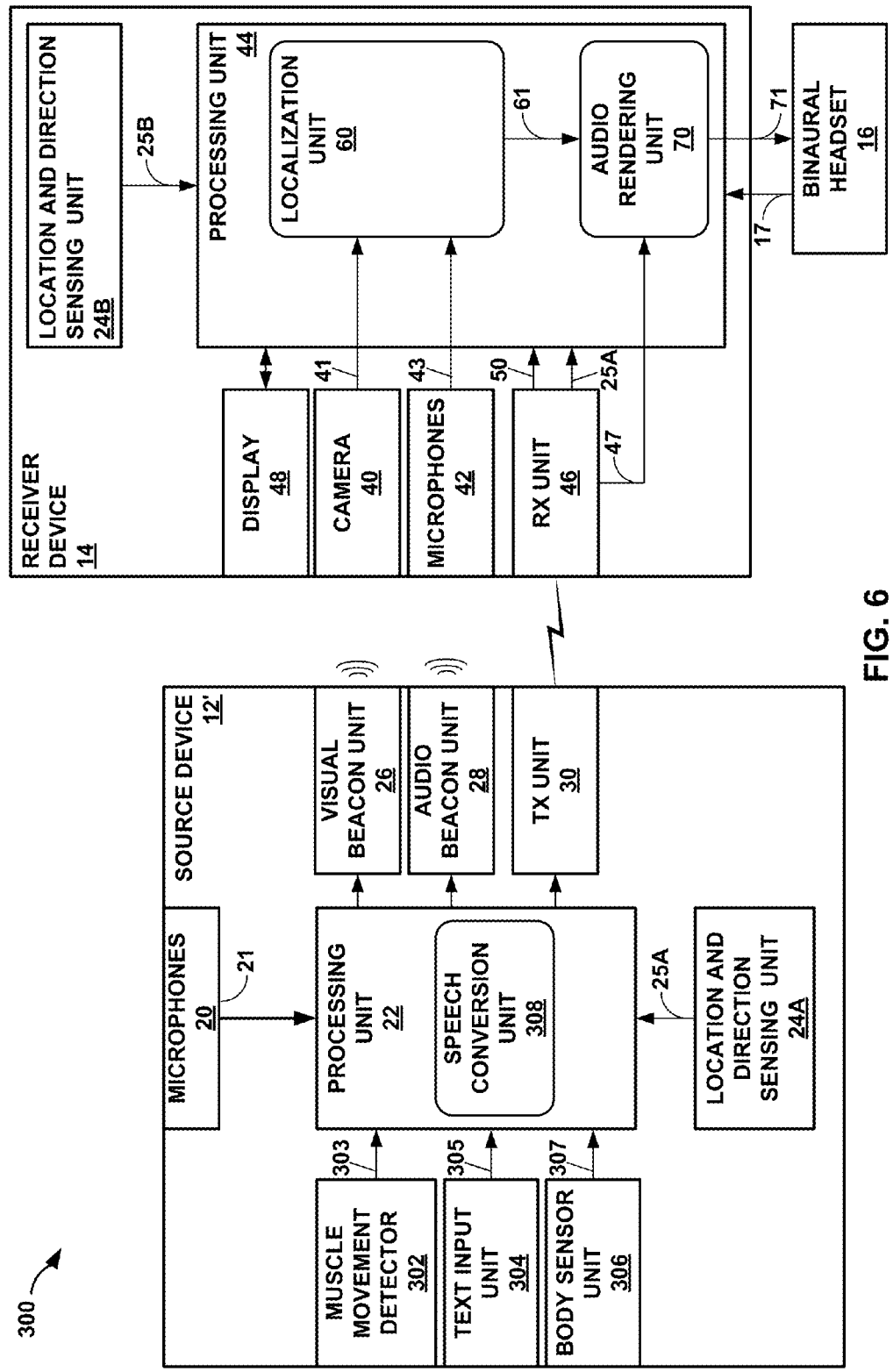
FIG. 6 is another block diagram illustrating an example system configured to perform various aspects of the assisted near distance communication techniques described in this disclosure.

FIG. 6 is another block diagram illustrating an example system 300 configured to perform various aspects of the assisted near distance communication techniques described in this disclosure. The example system 300 is similar to the example system 10 shown in the example of FIG. 1, except that the source device 12 has further functionality in terms of transmitting speech generated through other types of inputs than the microphones 20. The source device of the system 300 is denoted as source device 12' in order to denote the added functionality. Although some functionality of the source device 12' is not shown in the example of FIG. 6 for ease of illustration purposes, the source device 12' includes all of the functionality described above with respect to the source device 12 shown in the example of FIG. 1.

As shown in the example of FIG. 6, the source device 12' includes a muscle movement detector 302, a text input unit 304, and a body sensor unit 306. The muscle movement detector 302 may represent a unit configured to detect muscle movement, outputting muscle movement data 303 to processing unit 22. The muscle movement detector 302, while shown as being integrated within the source device 12', may be integrated within a headset 16 to which the source device 12' couples. The muscle movement detector 302 may detect muscle movement using electromyography, outputting the muscle movement data 303 as electromyography data 303.

The text input unit 304 may represent a unit configured to receive text input. The text input unit 304 may represent either a hardware keyboard, or other physical input mechanism for inputting text data 305. As an alternative to or in conjunction with a physical input mechanism (such as a touch sensitive display, which is assumed for ease of illustration purposes to be included within text input unit 304), the text input unit 304 may represent an on-screen virtual keyboard with which the operator interacts to input the text data 305.

The body sensor unit 306 may represent a unit configured to capture any form of sensible bodily function of the operator using the source device 12'. The body sensor unit 306, while shown as being integrated within the source device 12', may be integrated within a wearable device (such as a watch, a heart rate monitoring strap, an earbud of a headset, a wireless earbud, and the like) coupled to the source device 12'. The body sensor unit 306 may capture body sensor data 307, which may include one or more of electromyography (EMG) data, electroencephalogram (EEG) data, and/or electrocardiogram (EKG) data to provide a few examples. The body sensor unit 306 may output the body sensor data 307 to the processing unit 22.

The processing unit 22 may include a speech conversion unit 308, which represents a unit configured to convert the muscle movement data 303 and/or the text data 306 into the monophonic audio data 47 for transmission to the receiver device 14. The processing unit 22 may, when formulating the bitstream to include the monophonic audio data 47 (whether captured by the microphones 20 or converted from the muscle movement data 303 or the text data 305), add the body sensor data 307 to the bitstream prior to transmission of the bitstream to the receiver device 14. The receiver device 14 may present the body sensor data 307 via the display 48 or, either as an alternative or in addition to presenting the body sensor data 307, utilize the body sensor data 307 as the identifier 50 for associating the monophonic audio data 47 with the relative location 61 of the source device 12'.

Figure 7B:
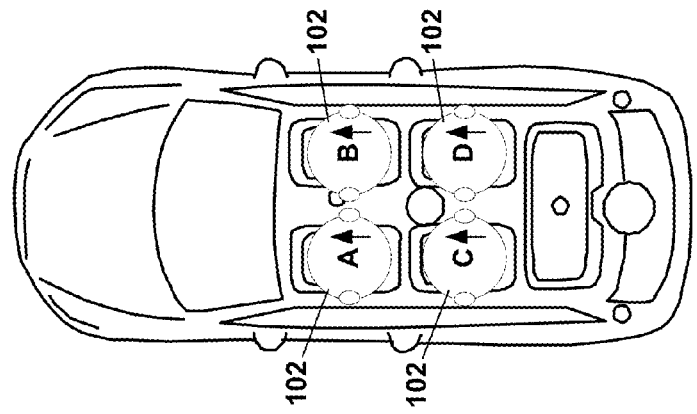
FIGS. 7A and 7B are diagrams showing additional examples of contexts in which the assisted near distance communication techniques described in this disclosure may facilitate near distance communication.
Figure 7A:
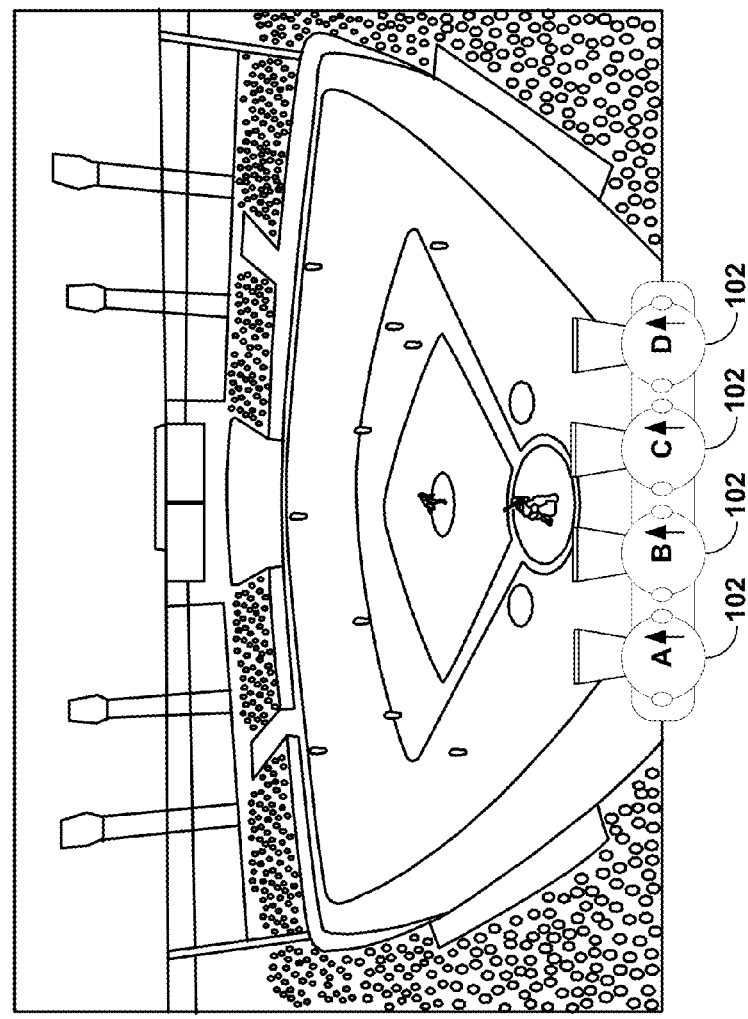

FIGS. 7A and 7B are diagrams showing additional examples of contexts 350A and 350B in which the assisted near distance communication techniques described in this disclosure may facilitate near distance communication. In the example of FIG. 7A, the operators 102 employ the near distance communication techniques of this disclosure in a sporting arena context 350A in which there may be high levels of ambient noise in the form of fans cheering, announcers, fireworks, motor vehicle noise, music, and the like. In the example of FIG. 7B, the operators 102 may employ the near distance communication techniques of this disclosure in an automobile context 350B in which there may be high levels of ambient noise in the form of wind noise, traveling noise, music, crying children, and the like. As such, the techniques may be employed in multiple different types of contexts in which there exists high levels of ambient noise.

In this way, the techniques may provide for a spatially correct binaurally rendered communication system in which natural audio-spatial perception is potentially provided in addition to potential voice enhancements. The techniques described in this disclosure may retrieve correct spatial relation of the sender/receiver and use the spatial information to render the binaural audio, resulting in potentially a more natural perceptual feeling to participants of the near distance communication. The operator of the receiver device may, in this way, hear the speaker's voice from the earpiece (given the close proximity of the earpiece to the listener's ear), and with a potentially spatially realistic binaural effect. The speakers voice may, in accordance with the techniques, be rendered by the receiver device in a way reflecting the correct direction (and/or distance) between the speaker and the listener, while also potentially making the speaker's voice sound clearer and more nature because the speakers voice is correlated with the speaker's relative location to the listener.

Any use of the term "and/or" throughout this disclosure should be understood to refer to either one or both. In other words, A and/or B should be understood to provide for either (A and B) or (A or B).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless communication device, a wireless handset, a mobile phone, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software or firmware.

Various embodiments of the invention have been described. These and other embodiments are within the scope of the following claims.

What is claimed is:

1. A first device configured to assist near distance communication, the first device comprising:
   a receiver configured to receive, from a second device located within a conversational distance to the first device, audio data representative of the near distance communication;
   one or more sensors configured to generate a sensor signal representative of spatial information of the near distance communication, wherein the one or more sensors include a camera and the sensor signal comprises video data obtained by the camera representative of the operator of the second device; and
   one or more processors coupled to the receiver and the one or more sensors, and configured to:
   perform visual tracking with respect to the video data to determine that the operator of the second device is speaking;
   determine, in response to determining that the operator of the second device is speaking, the spatial information, the spatial information including one or more of a direction of arrival of the audio data and a distance between the first device and the second device;
   render, based on the spatial information and the audio data, multi-dimensional audio data in which the near distance communication originates in a soundfield from a location of the second device relative to the first device; and
   output the multi-dimensional audio data to a transducer so as to reproduce the near distance communication in multiple dimensions.

2. The first device of claim 1,
   wherein the one or more sensors include a microphone configured to capture an ultrasound audio signal emitted by the second device,
   wherein the one or more processors are further configured to analyze the ultrasound audio signal to determine the spatial information, the spatial information including one or more of a direction of arrival of the audio data and a distance between the first device and the second device.

3. The first device of claim 2, wherein the one or more processors are configured to determine, based on the ultrasound audio signal, a signature audio beacon emitted by the second device so as to determine that the spatial information is associated with the second device.

4. The first device of claim 1, wherein the one or more sensors include multiple microphones configured to capture environmental audio data,
   wherein the one or more processors are further configured to analyze the environmental audio data to determine the spatial information, the spatial information including one or more of a direction of arrival of the audio data and a distance between the first device and the second device.

5. The first device of claim 4, wherein the processors are configured to:
   process the environmental audio data to determine a binaural delay; and
   determine the spatial information based on the determined binaural delay.

6. The first device of claim 1, wherein the one or more processors are configured to:
   determine, based on the video data, a signature light beacon emitted by the second device; and
   associate the spatial information with the second device based on the determined signature light beacon.

7. The first device of claim 1, wherein the visual tracking comprises lip tracking.

8. The first device of claim 1,
   wherein the one or more processors are further configured to perform voice activity detection with respect to the audio data to detect voice activity of an operator of the second device, and
   wherein the one or more processors perform lip tracking with respect to the video data in conjunction with the voice activity detection to determine the spatial information.

9. The first device of claim 1, wherein the visual tracking comprises face tracking.

10. The first device of claim 1,
    wherein the one or more processors are further configured to perform voice activity detection with respect to the audio data to detect voice activity of an operator of the second device, and
    wherein the one or more processors perform face tracking with respect to the video data in conjunction with the voice activity detection to determine the spatial information.

11. The first device of claim 1,
    wherein the one or more sensors include a global positioning system (GPS) sensor configured to capture a first GPS signal identifying a first location of the first device,
    wherein the receiver is further configured to receive a second GPS signal identifying a second location of the second device, and
    wherein the one or more processors are further configured to analyze the first and second GPS signals to determine the spatial information, the spatial information including one or more of a direction of arrival of the audio data and a distance between the first device and the second device.

12. The first device of claim 1,
wherein the one or more sensors include a gyroscope sensor configured to capture a first gyroscope signal identifying a first location of the first device,
wherein the receiver is further configured to receive a second gyroscope signal identifying a second location of the second device, and
wherein the one or more processors are further configured to analyze the first and second gyroscope signals to determine the spatial information, the spatial information including one or more of a direction of arrival of the audio data and a distance between the first device and the second device.

13. The first device of claim 1, wherein the first device interfaces with a headset including the transducer, the headset configured to be worn by an operator of the first device.

14. The first device of claim 13,
wherein the receiver is further configured to receive, from the headset, an orientation of the headset; and
wherein the one or more processors are configured to determine the spatial information based on the sensor signals and the received orientation of the headset.

15. The first device of claim 1,
wherein the transducer comprises a first transducer, and
wherein the first device includes a second transducer configured to emit an ultrasound audio signal so that the second device is able to identify a location of the first device relative to the second device.

16. The first device of claim 1,
wherein the one or more sensors include a global positioning system (GPS) sensor configured to capture a GPS signal identifying a location of the first device,
wherein the first device includes a transmitter configured to transmit, to the second device, the location of the first device so that the second device is able to identify a location of the first device relative to the second device.

17. The first device of claim 1, further comprising a light emitting unit configured to emit a signature light beacon so that the second device is able to identify a location of the first device relative to the second device.

18. The first device of claim 1, wherein the audio data comprises monophonic audio data.

19. A method for assisting near distance communication, the method comprising:
receiving, by a first device and from a second device located within a conversational distance from the first device, audio data representative of the near distance communication;
generating, by one or more sensors of the first device, a sensor signal representative of spatial information of the near distance communication, wherein the one or more sensors include a camera and the sensor signal comprises video data obtained by the camera representative of the operator of the second device;
performing, by the first device, visual tracking with respect to the video data to determine that the operator of the second device is speaking;
determining, by the first device and in response to determining that the operator of the second device is speaking, the spatial information, the spatial information including one or more of a direction of arrival of the audio data and a distance between the first device and the second device;
rendering, by the first device and based on the spatial information and the audio data, multi-dimensional audio data in which the near distance communication originates from a location of the second device relative to the first device; and
outputting, by the first device, the multi-dimensional audio data to a transducer so as to reproduce the near distance communication in multiple dimensions.

20. The method of claim 19,
wherein the one or more sensors include a microphone,
wherein microphone is configured to capture an ultrasound audio signal emitted by the second device, and
wherein the method further comprises:
determining, based on the ultrasound audio signal and the video data, the spatial information and a signature audio beacon; and
associating, based on the signature audio beacon, the audio data to the spatial information.

21. The method of claim 19,
wherein the one or more sensors include a microphone,
wherein the microphone is configured to capture an ultrasound audio signal emitted by the second device, and
wherein the method further comprises:
determining, based on the ultrasound audio signal and the video data, the spatial information and a signature audio beacon;
determining a level of correlation between the audio data and the signature audio beacon; and
associating, based on the level of correlation, the audio data to the spatial information.

22. The method of claim 19,
further comprising:
determining, based on the video data, a signature light beacon emitted by the second device; and
determining a level of correlation between the audio data and the signature light beacon; and
associating, based on the level of correlation, the audio data to the spatial information.

23. The method of claim 19, wherein the first device interfaces with a headset including the transducer, the headset worn by an operator of the first device.

24. The method of claim 23,
wherein the receiver is further configured to receive, from the headset, an orientation of the headset; and
wherein the one or more processors are configured to determine the spatial information based on the sensor signals and the received orientation of the headset.

25. The method of claim 19,
wherein the audio data comprises first audio data representative of a first near distance communication,
wherein the sensor signal comprises a first sensor signal representative of first spatial information, and
wherein the method further comprises:
receiving, by the first device and from a third device located within a conversational distance to the first device and the second device, second audio data representative of a second near distance communication;
generating a second sensor signal representative of second spatial information representative of the second near distance communication; and
associating the first spatial information with the first audio data and the second spatial information with the second audio data based on an identity associated with each of the first and second audio data or on a level of correlation between each of the respective first and second sensor signals and the first and second audio data, respectively.

26. The method of claim 19,
wherein the first device comprises a first mobile communication handset, and
wherein the second device comprises a second mobile communication handset.

27. The method of claim 19, wherein the visual tracking comprises lip tracking.

28. The method of claim 19, wherein the visual tracking comprises face tracking.

29. The method of claim 19, wherein the audio data comprises monophonic audio data.

30. A first device configured to assist near distance communication, the first device comprising:
   means for receiving, from a second device located within a conversational distance to the first device, audio data representative of the near distance communication;
   means for generating sensor signals representative of spatial information of the near distance communication, wherein the one or more sensors include a camera and the sensor signal comprises video data obtained by the camera representative of the operator of the second device;
   means for performing, by the first device, visual tracking with respect to the video data to determine that the operator of the second device is speaking;
   means for determining, by the first device and in response to determining that the operator of the second device is speaking, the spatial information, the spatial information including one or more of a direction of arrival of the audio data and a distance between the first device and the second device;
   means for rendering, based on the spatial information and the audio data, multi-dimensional audio data in which the near distance communication originates in a soundfield from a location of the second device relative to the first device; and
   means for outputting the multi-dimensional audio data to a transducer so as to reproduce the near distance communication in multiple dimensions.

31. A non-transitory computer-readable storage medium having stored thereon instructions that, when executed, cause one or more processors of a first device to:
   receive, from a second device located within a conversational distance to the first device, audio data representative of near distance communication;
   obtain, from one or more sensors of the first device, sensor signals representative of spatial information of the near distance communication, wherein the one or more sensors include a camera and the sensor signal comprises video data obtained by the camera representative of the operator of the second device;
   perform visual tracking with respect to the video data to determine that the operator of the second device is speaking;
   determine, in response to determining that the operator of the second device is speaking, the spatial information, the spatial information including one or more of a direction of arrival of the audio data and a distance between the first device and the second device;
   render, based on the spatial information and the audio data, multi-dimensional audio data in which the near distance communication originates in a soundfield from a location of the second device relative to the first device; and
   output the multi-dimensional audio data to a transducer so as to reproduce the near distance communication in multiple dimensions.

\* \* \* \* \*